UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

1,189,803.  Specification of Letters Patent.  Patented July 4, 1916.

No Drawing.  Application filed February 25, 1907.  Serial No. 359,264.

*To all whom it may concern:*

Be it known that I, CARLETON ELLIS, a citizen of the United States, and resident of White Plains, in the county of Westchester and State of New York, have made a certain new and useful Invention Relating to Paint or Varnish Removers, of which the following is a specification.

This invention relates to paint or varnish removers and relates especially to removers comprising amino solvents for use on painted surfaces.

Many of the amino solvents, that is, hydrocarbon bodies containing the amino or $NH_2$ group are valuable solvents for paint and varnish films and especially desirable in removing ordinary paint. Such of these bodies, which, of course, include the amino bodies, as have the proper fluid condition under ordinary temperatures, may be used for this purpose, both in the aromatic and the aliphaic series of hydrocarbons. Illustrative examples of such aromatic amino solvents are anilin, toluidin and xylidin, the lower members being more active solvents in most cases. An aliphatic amino solvent of this character is butylamin. These amino solvents, preferably of the anilin order, may be used in removers in connection with suitable thinning solvent material such as penetrating solvent material, that is, solvents having a generally benzolic character or action in removers, such as benzol and its homologues, toluol, xylol, mesitylene, cumene, and so forth, commercial xylol being a mixed solvent of this order, carbon-bisulfid, turpentine, wood turpentine, carbon-tetrachlorid, benzin, kerosene, and so forth. Loosening finish solvent material may also be used, that is, solvent material of a generally alcoholic character or action in removers, including grain, wood or denatured alcohol or ketonic solvents, such as acetone, methyl ethyl ketone, acetone oil, ethyl butyl ketone, aldehydes and so forth, as well as other hydrocarbon solvents. Although not necessary in all cases, suitable stiffening material, such as wood flour, starch, whiting, infusorial earth and soapy or waxy bodies, such as ceresin or paraffin wax, may be used to increase the consistency of the remover and to decrease evaporation by the film-forming properties of the waxy or soapy bodies. All these ingredients are preferably thoroughly incorporated by agitation under the desired moderate heat, the waxy or soapy bodies being preferably first dissolved in the more energetic wax solvents, although this is not always necessary.

An illustrative remover of this character, especially suitable for use on paint coatings, may comprise anilin 20 parts, benzol 10 parts, acetone 10 parts, ceresin wax 1 part, wood flour 3 parts, starch 2 parts.

Another illustrative remover may comprise toluidin 5 parts, anilin 10 parts and ceresin wax 1 part.

Still another illustrative remover, more especially suitable for tank work, may comprise anilin 100 parts, lightest grade of kerosene or heavy benzin 100 parts, commercial xylol 25 parts and ceresin wax 1 part, although it is, of course, understood that the stiffening material is not necessary in all cases.

This invention has been described in connection with a number of illustrative ingredients, formulas, proportions and processes, to the details of which disclosure the invention is not, of course, to be limited.

What is claimed is:—

1. The paint or varnish remover comprising approximately anilin 20 parts, benzol 10 parts, acetone 10 parts, ceresin wax 1 part, wood flour 3 parts and starch 2 parts.

2. The paint or varnish remover comprising approximately anilin 20 parts, benzol 10 parts, acetone 10 parts and stiffening material, including wax.

3. The paint or varnish remover comprising approximately anilin 20 parts, benzol 10 parts, loosening finish solvent material 10 parts, and stiffening material, including a waxy body.

4. The paint or varnish remover comprising approximately amino finish solvent material of the anilin order 20 parts, aromatic solvent material 10 parts, loosening finish solvent material 10 parts and stiffening material.

5. The paint or varnish remover comprising amino solvent material of the anilin order, miscible penetrating and loosening finish solvent material, and stiffening material.

6. The paint or varnish remover comprising organic amino finish solvent material, other finish solvent material miscible therewith, and stiffening material.

7. The paint or varnish remover comprising amino solvent material, loosening finish solvent material miscible therewith, and stiffening material.

8. The paint or varnish remover comprising approximately anilin 20 parts, benzol 10 parts, and acetone 10 parts.

9. The paint or varnish remover comprising approximately anilin 20 parts, benzol 10 parts, acetone 10 parts, and stiffening material.

10. The paint or varnish remover comprising approximately anilin 20 parts, a benzol solvent 10 parts, and loosening finish solvent material 10 parts.

11. The paint or varnish remover comprising approximately amino solvents of the anilin order 20 parts, benzol 10 parts, and loosening solvent material 10 parts.

12. The paint or varnish remover comprising aromatic amino solvents, other paint or varnish solvents miscible therewith and incorporated evaporation retarding stiffening material.

13. The paint or varnish remover comprising solvent liquid containing the amino group, finish solvent material miscible therewith, and stiffening material.

14. The paint or varnish remover comprising amino solvent material, incorporated miscible volatile organic finish solvent material and waxy stiffening material.

15. The paint or varnish remover comprising amino solvent material, incorporated miscible volatile organic finish solvent material including ketonic loosening material and evaporation retarding stiffening material.

16. The paint or varnish remover comprising a solvent liquid containing the amino group and volatile organic finish solvent material miscible therewith.

17. The paint or varnish remover comprising a solvent liquid containing the amino group, incorporated organic finish solvent material miscible therewith and evaporation retarding stiffening material.

18. The paint or varnish remover comprising composite organic finish softening material including amino solvent material and incorporated waxy stiffening material.

19. The paint or varnish remover consisting in large part of composite volatile finish softening material including amino solvent material and aromatic finish solvent material and waxy stiffening material.

20. The paint or varnish remover consisting in large part of composite volatile finish supporting material including substantially neutral amino finish solvent material and aromatic finish solvent material and stiffening material.

21. The paint or varnish remover comprising approximately anilin 20 parts, aromatic finish solvent material including benzol 10 parts and stiffening material.

CARLETON ELLIS.

Witnesses:
HARRY L. DUNCAN,
JESSIE B. KAY.